(12) United States Patent
Baba (10) Patent No.: US 7,197,936 B2
(45) Date of Patent: Apr. 3, 2007

(54) PRESSURE SENSOR

(75) Inventor: Hironobu Baba, Oobu (JP)

(73) Assignee: Denso Coporation, Kariya (JP)

( * ) Notice: Subject to any disclaimer, the term of this patent is extended or adjusted under 35 U.S.C. 154(b) by 20 days.

(21) Appl. No.: 10/994,295

(22) Filed: Nov. 23, 2004

(65) Prior Publication Data

US 2005/0109113 A1 May 26, 2005

(51) Int. Cl.
*G01L 7/08* (2006.01)
(52) U.S. Cl. .............................. 73/715; 73/753; 73/756
(58) Field of Classification Search .......... 73/700–756, 73/861.52; 361/283.1–283.4
See application file for complete search history.

(56) References Cited

U.S. PATENT DOCUMENTS

| 3,067,617 | A | * | 12/1962 | Buck ........................... 73/701 |
| 3,831,951 | A |   | 8/1974  | Patel et al. |
| 4,336,946 | A | * | 6/1982  | Wheeler ..................... 277/529 |
| 4,512,496 | A | * | 4/1985  | Tsou .......................... 220/319 |
| 5,144,843 | A | * | 9/1992  | Tamura et al. ................ 73/727 |
| RE34,610  | E | * | 5/1994  | Miller et al. ................. 137/597 |
| 5,564,177 | A |   | 10/1996 | Fernandes et al. |
| 5,868,397 | A | * | 2/1999  | Kuboshima et al. ......... 277/637 |
| 6,238,560 | B1 | * | 5/2001 | Gershenson ................ 210/342 |
| 6,301,969 | B1 |   | 10/2001 | Hess |
| 6,374,679 | B1 |   | 4/2002  | Babala et al. |
| 6,543,290 | B1 | * | 4/2003 | Engstrom et al. ............. 73/715 |
| 2002/0036411 | A1 | * | 3/2002 | Quick et al. ................ 294/64.1 |
| 2004/0089836 | A1 | * | 5/2004 | Wu ............................ 251/326 |

FOREIGN PATENT DOCUMENTS

| DE | 4141894 A1 | 6/1993 |
| JP | A-H10-76400 | 3/1998 |
| JP | A-2001-33335 | 2/2001 |
| JP | A-2002-221462 | 8/2002 |

OTHER PUBLICATIONS

First Office Action issued from French Patent Office issued on Nov. 24, 2005 for the corresponding French patent application No. 200412469000 (a copy thereof).
First Office Action from Chinese Patent Office issued on Apr. 14, 2006 for the corresponding Chinese patent application No. 200410095385.0 (a copy and English translation thereof).

* cited by examiner

*Primary Examiner*—Edward Lefkowitz
*Assistant Examiner*—Jermaine Jenkins
(74) *Attorney, Agent, or Firm*—Posz Law Group, PLC (57) ABSTRACT

A ring-like groove 140 for accommodating a seal ring 130 is formed in fitting surfaces 12c and 13c of pressure introduction portions 12b and 13b for introducing a pressure from a measured member 200 to a sensing portion. The pressure introduction portions 12b and 13b are fitted to the measured member 200 through the seal ring 130. Projection portions 141 are formed on the side surface of the groove 140 and a part of the seal ring 130 is pressed at these projection portions 141 into the groove 140. The seal ring 130 is thus retained inside the groove 140.

13 Claims, 9 Drawing Sheets

PRESSURE SENSOR

BACKGROUND OF THE INVENTION

1. Field of the Invention

This invention relates to a pressure sensor that introduces a pressure from a pressure introduction portion to a sensing portion accommodated in a case and is fitted, at this pressure introduction portion, to a measured member through a seal ring. The invention can be applied to a pressure sensor for detecting a pressure inside an EGR pipe in an EGR system, for example.

2. Description of the Related Art

Restrictions on emissions have been tightened in recent years and NOx and PM (particulate matters) produced by a Diesel engine must be reduced. An EGR (Exhaust Gas Recirculation) system has drawn an increasing attention, particularly, as a system for reducing NOx.

The system returns a part of an exhaust gas to an intake side and lowers an oxygen concentration to reduce NOx. In this system, it is important to control the return quantity from the exhaust side to the intake side, and a pressure sensor is used as means for detecting a flow rate.

A pressure sensor including a sensing portion for detecting a pressure, a case for accommodating the sensing portion and a pressure introduction portion for introducing pressure from outside the case to the sensing portion has been proposed as such a pressure sensor (refer to Japanese Unexamined Patent Publication No. 2002-221462, for example).

When such a pressure sensor is assembled to the EGR pipe as the measured member, the pressure sensor is generally fitted to the EGR pipe through a ring-like seal ring (an O-ring) at the pressure introduction portion.

Figure 9:
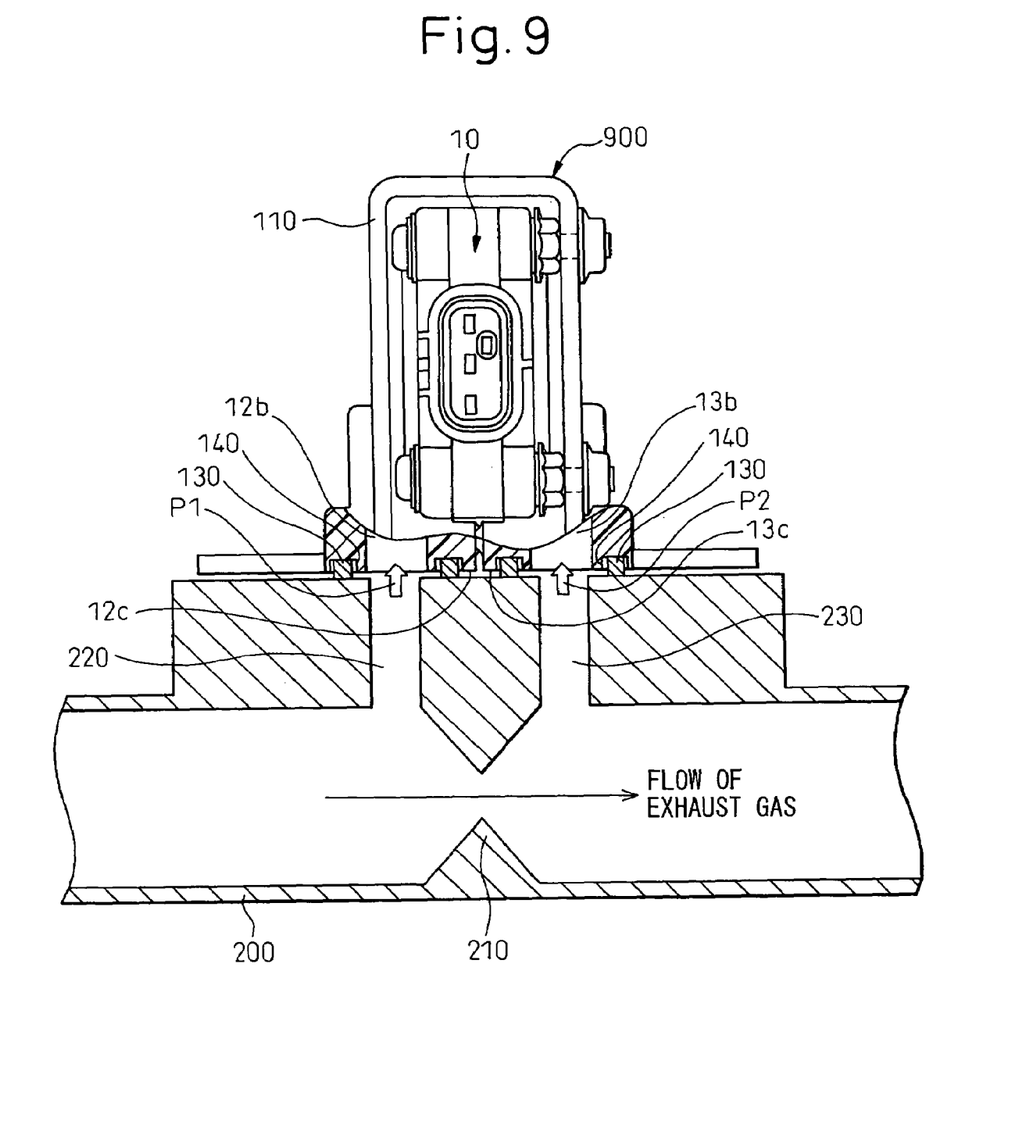
FIG. 9 is a schematic sectional view showing an ordinary example of assembly of a conventional sensor to an EGR pipe.
Figure 10A:
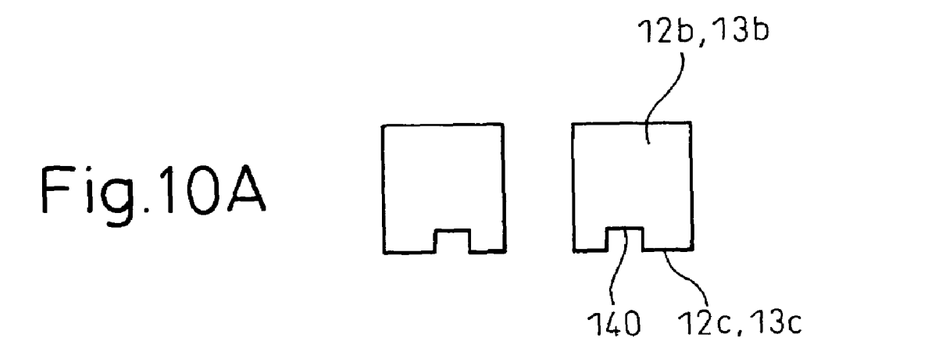
FIG. 10A is a sectional view of the pressure introduction portion.
Figure 10B:
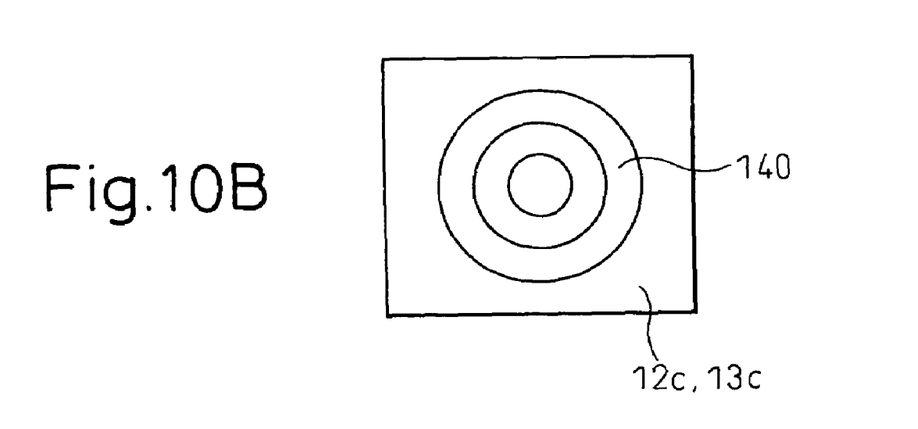
FIG. 10B is a plan view of the fitting surface and FIG. 10C shows a dimensional relation between a groove formed in the fitting surface and the seal ring.
Figure 10C:
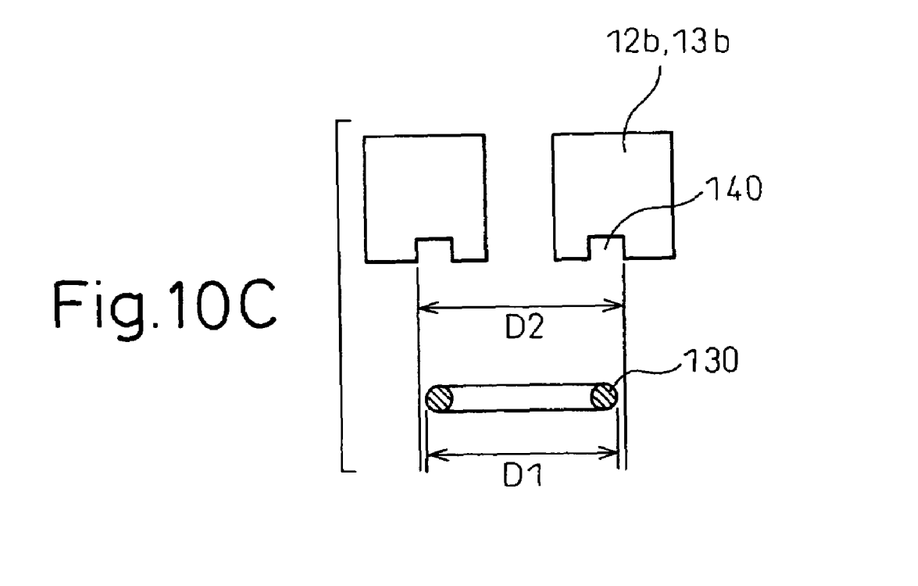

FIG. 9 is a schematic sectional view showing an ordinary example of an assembly process of the pressure sensor 900 to the EGR pipe 200. FIGS. 10A to 10C show the fitting surfaces (that is, seal surfaces) of the pressure introduction portions 12b and 13b in the pressure sensor 900 shown in FIG. 9 and the shape of the seal ring (O-ring) 130.

Here, FIG. 10A is a sectional view of the pressure introduction portions 12b and 13b. FIG. 10B is a plan view of the fitting surfaces 12c and 13c. FIG. 10C shows a dimensional relation between a groove 140 formed in the fitting surface 12c, 13c and the seal ring 130.

In this pressure sensor 900, a sensing portion (not shown) for detecting a pressure is accommodated in a case 10 as shown in FIG. 9. Pressure introduction portions 12b and 13b having openings are formed in the case 10. The pressure sensor 900 is fixed to an EGR pipe 200 by screw-fastening, etc., through a bracket 110.

The pressure introduction portions 12b and 13b are fitted to the EGR pipe 200 through the seal rings 130 made of an elastic material such as rubber. Consequently, pressures P1 and P2 from inside the EGR pipe 200 are introduced without leakage into the case 10 through the openings of the pressure introduction portions 12b and 13b and are guided to the sensing portion described above.

As shown in FIGS. 10A to 10C, a ring-like groove 140 for accommodating the seal ring 130 is formed in the fitting surface 12c and 13c of each pressure introduction portion 12b and 13b.

To measure the flow rate of the EGR, it is customary to dispose an orifice 210 inside the EGR pipe 200 and to detect a pressure difference between portions ahead of and behind the orifice 210 as shown in FIG. 9. In other words, the pressure sensor 900 shown in FIG. 9 is constituted as a pressure difference (relative pressure) detection type pressure sensor 900.

Incidentally, the internal construction of the EGR pipe 200 at the connection portion with the pressure sensor 900 includes an upstream side pressure discharge path 220 for discharging an upstream side pressure P1 of the orifice 210 and a downstream side pressure discharge path 230 for discharging a downstream side pressure P2 of the orifice 210 as shown in FIG. 9.

The upstream side pressure discharge path 220 communicates with one of the pressure introduction portions 12b of the pressure sensor 900 through the seal ring 130 and the downstream side pressure discharge path 230 communicates with the other of the pressure introduction portions 13b of the pressure sensor 900 through the seal ring 130.

As for the detection pressure, a pulsation peak of the exhaust pressure reaches maximum of 300 kPa depending on the exhaust quantity and on the absence/existence of a turbo. Therefore, ordinary rubber hose piping cannot be used for the connection of the pressure sensor and the EGR pipe, and an assembly structure using a seal ring 130, that is, a so-called "direct mount structure", is employed as shown in FIG. 9.

According to this direct mount structure, however, the seal ring 130 faces down when the pressure sensor 900 is set to the mounting portion of the EGR pipe 200. Therefore, in the ordinary O-ring seal structure in which an outer diameter D1 of the seal ring 130 is smaller than an outer diameter D2 of the groove 140 as shown in FIG. 10C, the seal ring 130 falls off from the groove 140.

Figure 11A:
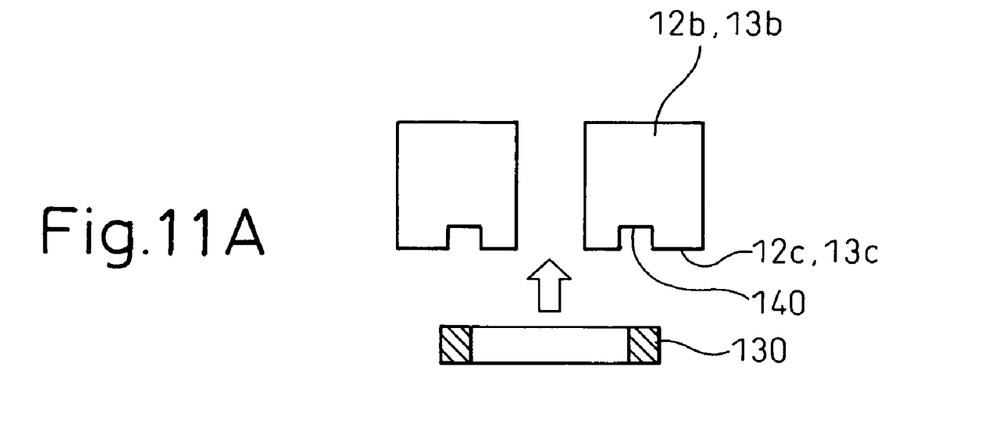
FIG. 11A shows a dimensional relation between the seal ring and the groove.

To prevent the seal ring 130 from falling off ("fall-off") at the time of assembly to the measured member, a structure using a seal ring 130 having a rectangular sectional shape has been employed in the past as shown in FIG. 11A.

Figure 11B:
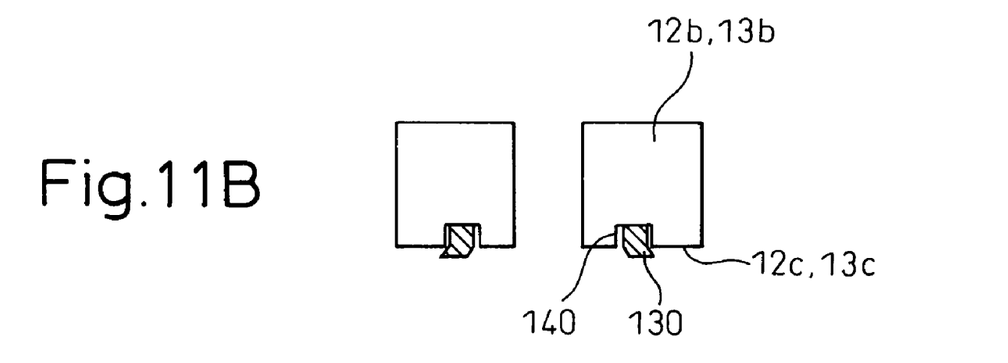
FIG. 11B shows the state after press-in is made and FIG. 11C shows the state after assembly of a sensor.
Figure 11C:
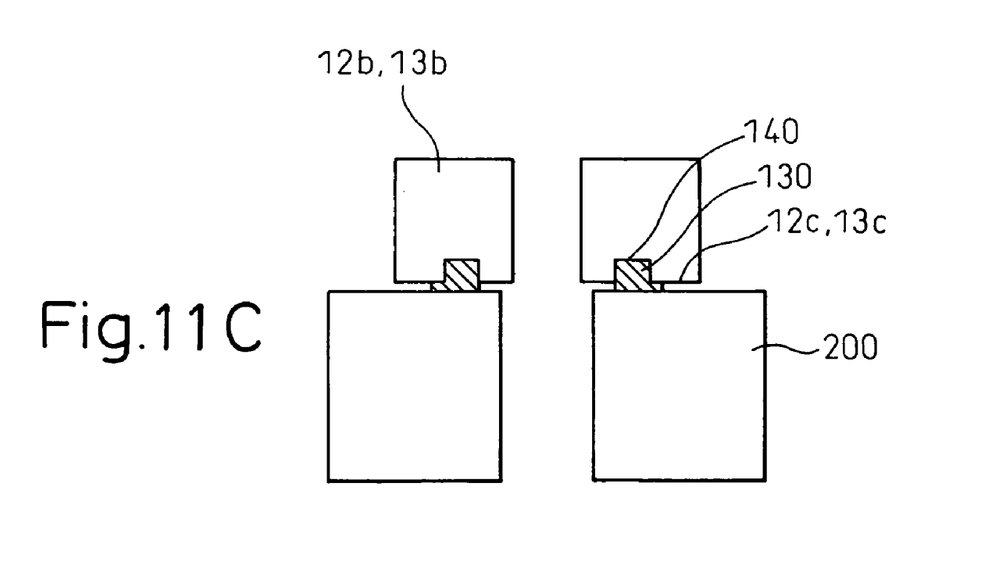

FIGS. 11A to 11C show a press-in structure using the seal ring 130 having the rectangular sectional shape of the prior art into the groove 140. FIG. 11A shows a dimensional relation between the seal ring 130 and the groove 140. FIG. 11B shows a state after the seal ring 130 is pressed into the groove 140. FIG. 11C shows the state after the pressure sensor 900 is assembled to the measured member 200.

As shown in FIG. 11A, the prior art employs the structure in which the seal ring 130 has the rectangular section and the outer diameter of the overall seal ring 130 is greater than the outer diameter of the groove 140.

Consequently, the state where the seal ring 130 is pressed as a whole into contact with the groove 140, that is, the structure in which the seal ring 130 is gently pressed as a whole into the groove 140, can be established, so that the seal ring 130 is held by the groove 140 and fall-off is prevented.

According to this structure, however, there is the possibility that the distal end of the seal ring 130 swells out transversely from the groove 140 when the seal ring 130 is pressed into the groove 140 as shown in FIG. 11B.

Then, the distal end portion of the seal ring 130 is clamped between the fitting surface 12c, 13c and the mounting portion of the measured member 200 as shown in FIG. 11C. In other words, the seal ring 130 swells out ("swell-out") and the seal ring 130 is damaged.

The problem described above is a common problem in pressure sensors employing the direct mount assembly structure in which the pressure introduction portion is fitted to the measured member through the ring-like seal ring and in the pressure sensor assembled to the EGR pipe as the measured member.

SUMMARY OF THE INVENTION

In view of the problems described above, the invention aims at preventing fall-off and damage of a seal ring at the time of assembly of the seal ring to a measured member in a pressure sensor in which pressure is introduced from a pressure introduction portion to a sensing portion accommodated in a case and the pressure introduction portion is fitted to the measured member through the seal ring.

To accomplish the object described above, one aspect of the present invention provides a pressure sensor including a sensing portion (20) for detecting a pressure; a pressure introduction portion (12b, 13b) fitted to a measured member (200) through a ring-like seal ring (130), for introducing a pressure from the measured member (200) into the sensing portion (20); and a ring-like groove (140) for accommodating the seal ring (130), formed in a fitting surface (12c, 13c) of the pressure introduction portion (12b, 13b) to the measured member (200); wherein a part of the seal ring (130) is pressed into the groove (140) and the seal ring (130) is retained inside the groove (140).

According to this construction, a part of the seal ring (130) is pressed into the groove (140) and the seal ring (130) is retained inside the groove (140). Therefore, even when the seal ring (130) is turned down, the seal ring (130) does not fall off from the groove (140).

As it is only necessary to press a part of the seal ring (130) into the groove (140), the outer size of the groove (140) can have a sufficient margin with respect to the outer shape of the seal ring (130) at portions other than the press-in portion. Therefore, swell-out of the seal ring that has occurred in the prior art can be prevented.

According to the pressure sensor of the invention, therefore, fall-off and damage of the seal ring (130) at the time of assembly to the measured member (200) can be prevented.

In the invention, a projection portion (141) protruding from a side surface of the groove (140) is formed on the side surface, and a part of the seal ring (130) is pressed at the projection portion (141) into the groove (140).

Because a part of the seal ring (130) is pressed into the groove (140), a structure for retaining the seal ring (130) inside the groove (140) can be appropriately accomplished.

In the pressure sensor described above, a surface of the projection portion (141) formed on the side surface of the groove (140) has a convex curve shape.

According to this construction, corners do not exist on the projection portion (141) and damage of the seal ring (130) pressed into this projection portion (141) can be desirably prevented.

In the invention, a surface of the projection portion (141) formed on the side surface of the groove (140) on the side of the fitting surface (12c, 13c) is a taper surface (141a) progressively departing from the fitting surface (12c, 13c) from a root side to a distal end of the projection portion (141).

According to this construction, the surface of the projection portion (141) formed on the side surface of the groove (140) on the side of the fitting surface (12c, 13c) is the taper surface (141a) described above. Therefore, it is possible to prevent the portion of the seal ring (130) pressed into the groove while keeping contact with the projection portion (141) from being clamped while swelling out between the fitting surface (12c, 13c) and the measured member (200), that is, to prevent catch of the seal ring (130) at the projection portion (141).

Because the surface of the projection portion (141) on the side of the fitting surface (12c, 13c) is the taper surface (141a), fitting of the seal ring (130) into the groove (140) becomes smooth and consequently, assembling performance of the seal ring (130) can be improved.

In the invention, the number of projection portions (141) formed on the side surface of the groove (140) is preferably two or more.

In the invention, a projection portion (131) is so formed on a surface of the seal ring (130) as to protrude from the surface, and the seal ring (130) is pressed at the projection portion (131) into the groove (140).

Consequently, a construction in which a part of the seal ring (130) is pressed into the groove (140) and the seal ring (140) is held inside the groove (140) can be appropriately accomplished.

In the invention, the number of projection portion (130) formed on the surface of the seal ring (130) is preferably two or more.

In the invention, a projection portion (141) protruding from a side surface of the groove (140) is formed on the side surface, a projection portion (131) protruding from a surface of the seal ring (130) is formed on this surface, and the seal ring (130) is pressed into the groove (140) at the projection portion (141) formed on the side surface of the groove (140) and at the projection portion (131) formed on the surface of the seal ring (130).

Consequently, a construction in which a part of the seal ring (130) is pressed into the groove (140) and the seal ring (130) is held inside the groove (140) can be appropriately accomplished.

In the invention, the shape of the seal ring (130) is a perfect circle and the shape of the groove (140) is elliptic.

In the invention, the shape of the seal ring (130) is elliptic and the shape of the groove (140) is a perfect circle.

In these cases, too, a construction in which a part of the seal ring (130) is pressed into the groove (140) and the seal ring (130) is held inside the groove (140) can be appropriately accomplished.

According to another aspect of the invention, there is provided a pressure sensor including a sensing portion (20) for detecting a pressure; a pressure introduction portion (12b, 13b) fitted to a measured member (200) through a ring-like seal ring (130), for introducing a pressure from the measured member (200) into the sensing portion (20); and a ring-like groove (140) for accommodating the seal ring (130), formed in a fitting surface of the pressure introduction portion (12b, 13b) to the measured member (200); wherein the seal ring (130) is bonded to and retained inside the groove (140).

According to this construction, the seal ring (130) is bonded to the groove (140) and is retained inside the groove (140). Therefore, even when the seal ring (130) is turned in a downward direction, the seal ring (130) does not fall off from the groove (140).

Because the seal ring (130) needs only be bonded to the groove (140), the outer size of the groove (140) may have a sufficient margin with respect to the outer shape of the seal ring (130). Therefore, swell-out of the seal ring from the groove that has occurred in the prior art can be prevented as much as possible.

According to the pressure sensor of the invention, therefore, fall-off and damage of the seal ring at the time of assembly to the measured member (200) can be prevented.

In the invention, the seal ring (130) is bonded to the groove (140).

Therefore, fall-off of the seal ring at the time of assembly to the measured member (200) can be prevented in the same way as described above.

Incidentally, reference numerals inside the parentheses represent an example of correspondence with concrete means described in later-appearing embodiments.

BRIEF DESCRIPTION OF THE DRAWINGS

The present invention may be more fully understood from the description of preferred embodiments of the invention, as set forth below, together with the accompanying drawings.

In the drawings:

FIGS. 10A to 10C show a fitting surface of a pressure introduction portion and a shape of a seal ring in the pressure sensor shown in FIG. 9, wherein FIGS. 11A to 11C are schematic sectional views showing a press-in construction of a seal ring having a square sectional shape according to the prior art into a seal ring, wherein

DESCRIPTION OF THE PREFERRED EMBODIMENTS

Preferred embodiments of the invention will be hereinafter explained with reference to the accompanying drawings. In the description that follows, like reference numerals will be assigned to identify like portions or equivalent portions for the purpose of simplifying the explanation.

First Embodiment

Figure 1:
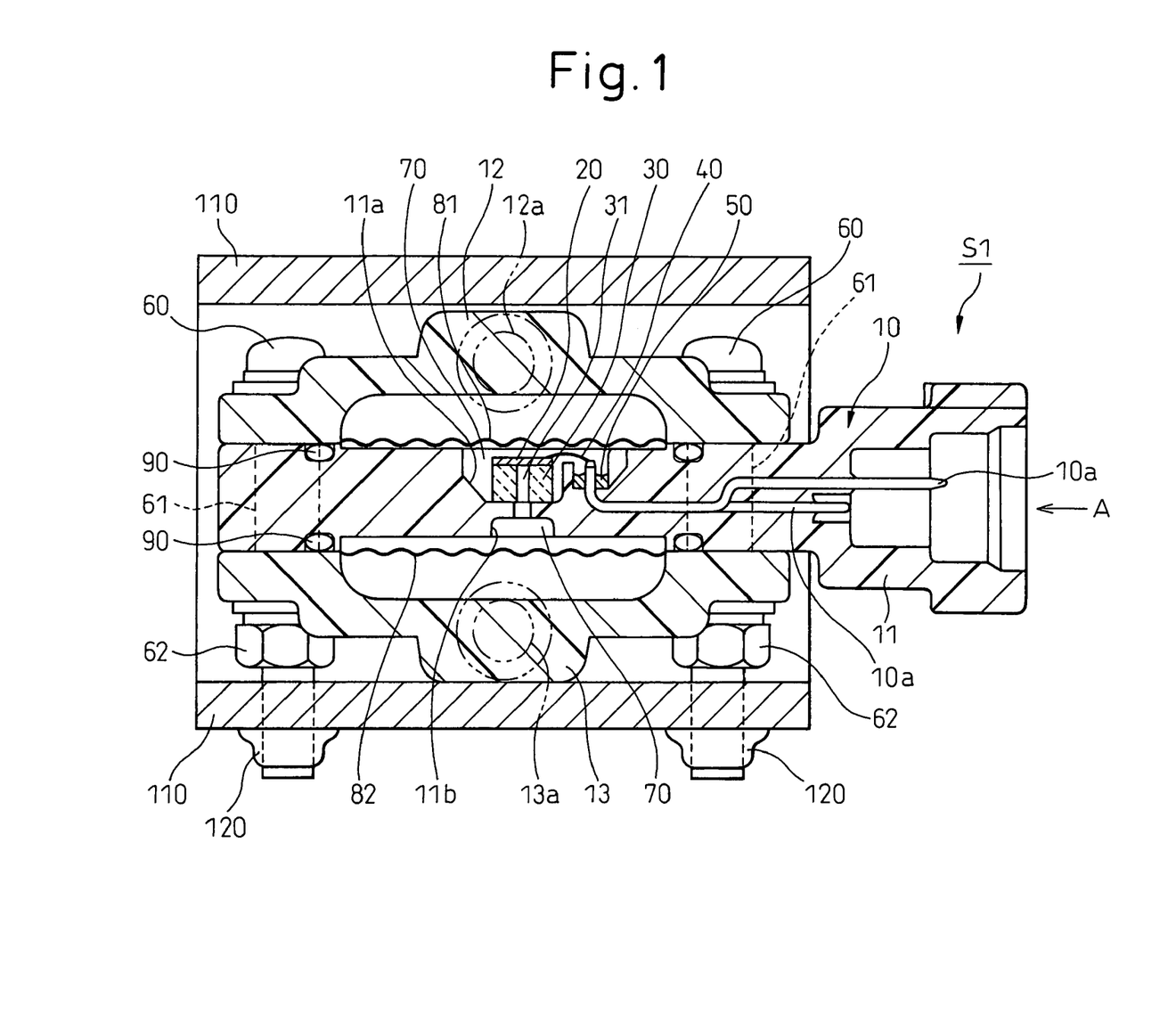
FIG. 1 shows a schematic sectional construction of a pressure sensor according to a first embodiment of the present invention.
Figure 2:
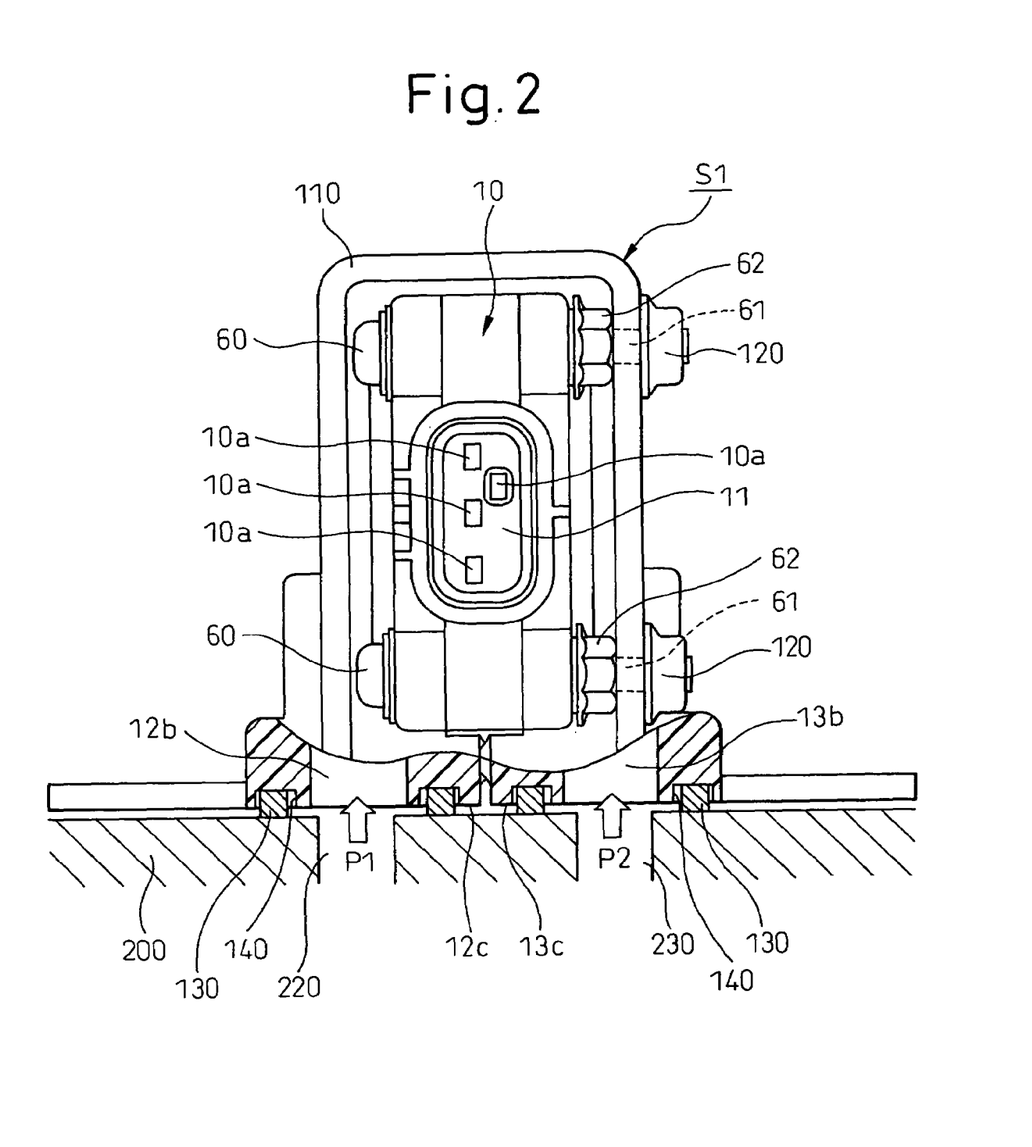
FIG. 2 is a partially cutaway sectional view showing the construction when viewed from a direction of an arrow A in FIG. 1.

FIG. 1 shows a schematic sectional construction of a pressure difference detection type pressure sensor S1 according to the first embodiment of the present invention. FIG. 2 is a partial cutaway sectional view showing a construction of the pressure sensor S1 when it is viewed from a direction of arrow A in FIG. 1 and is rotated by 90 degrees under the state where the pressure sensor S1 is assembled to a measured member 200.

This embodiment can be applied to a pressure difference (relative pressure) detection type pressure sensor that is fitted to an EGR pipe 200 as the measured member in an EGR system of a Diesel engine of an automobile, though not particularly limited thereto, in the same way as the one shown in FIG. 9, and detects a pressure difference ahead and behind an orifice disposed inside the EGR pipe 200.

Referring to FIG. 1, a case 10 defines a main body of the pressure sensor S1 and is made of a resin material such as PBT (polybutylene terephthalate), PPS (polyphenylene sulfide), and so forth.

The case 10 includes a connector case portion (sensor chip installation portion) 11 with which a terminal 10a is insert-molded, and first and second port portions 12 and 13 assembled to the connector case portion 11. Each of these portions 11 to 13 on the case 10 is formed by molding a resin.

A first recess portion 11a is formed on one of the surfaces (upper surface in FIG. 1) at the connector case portion 11 of the case 10 and a second recess portion 11b communicating with the first recess portion 11a is formed on the opposite surface (lower surface in FIG. 1). A sensor chip 20 for pressure detection is disposed inside the first recess portion 11a in such a manner as to cut off the communication portion between the first and second recess portions 11a and 11b.

The sensor chip 20 is constituted into a sensing portion and generates an electric signal of a level corresponding to a pressure value applied. The sensor chip 20 of this embodiment is a semiconductor diaphragm type sensor chip having a diaphragm (not shown in the drawing) as a reduced thickness portion on a semiconductor substrate such as a silicon substrate.

A base 30 made of glass, or the like, is bonded to and integrated with the sensor chip 20. The sensor chip 20 is bonded, stored and fixed to the bottom surface of the first recess portion 11a of the connector case portion 11 through the base 30 by using an adhesive such as a silicone type adhesive not shown in the drawing.

A through-hole 31 communicating with the second recess portion 11b is formed in the base 30. In other words, the second recess portion 11b extends up to the through-hole 31 of the base 30 but its extension is cut off by the sensor chip 20, and the first and second recess portions 11a and 11b are cut off, from each other, with the sensor chip 20 being the boundary.

The terminal 10a insert-molded with the connector portion 11 is for taking out the signal from the sensor chip 20 and is made of an electrically conductive metal such as copper. One of the ends of the terminal 10a is exposed to the first recess portion 11a in the proximity of the sensor chip 20 and is electrically connected to the sensor chip 20 by a wire 40 of aluminum or gold.

A seal material 50 for sealing the space between the terminal 10a and the connector case portion 11 is disposed around one of the ends of the terminal 10a exposed inside the first recess portion 11a. The seal material 50 is made of a resin, or the like.

The terminal 10a is so arranged as to extend from the sensor chip 20 in a direction parallel to the mounting surface of the sensor chip 20 in the case 10, that is, the bottom surface of the first recess portion 11a of the connector case portion 11, and the end portion on the opposite side to the connection portion with the wire 40 is exposed outside the case 10 (connector case portion 11).

The exposed end portion of this terminal 10a can be connected to an external wiring member, not shown, with the connector case portion 11 so that the sensor chip 20 can exchange the signals with an external circuit (such as an ECU of the automobile) through the wire 40 and the terminal pin 10a.

The connector case portion 11 of the case 10 is constituted in the manner described above into a sensor chip installation portion in which the sensor chip 20 is installed. Pressure introduction ports 12a and 13a are provided to the first and second port portions 12 and 13, respectively, as indicated by two-dot-chain lines in FIG. 1.

The connector case portion 11 and the port portions 12 and 13 are joined to one another by using screws and nuts 61 and 62 as screw members.

The nut 61 is insert-molded with the connector case portion 11. After the connector case portion 11 and the first and second port portions 12 and 13 are screwed by the screws 60 and the nuts 61, they are fastened by the nuts 62. Incidentally, rivets may be used in place of the screw members 60 to 62.

Oil 70 such as fluorine type oil or silicone type oil is filled into the first and second recess portions 11a and 11b of the connector case portion 11 in the case 10.

A first diaphragm 81 is fixed between the connector case portion 11 and the first port portion 12 and a second diaphragm 82 is fixed between the connector case portion 11 and the second port portion 13 in the case 10.

The first and second diaphragms 81 and 82 in this embodiment are metal diaphragms made of a metal having high corrosion resistance and high heat resistance such as Cr or Ni and can be made, for example, of a material having a pore corrosion index expressed by (Cr+3.3 Mo+20N) of at least 50 and containing at least 30 wt % of Ni.

The first diaphragm 81 is so arranged as to cover the first recess portion 11a and seals the oil 70 inside the first recess portion 11a as shown in FIG. 1. On the other hand, the second diaphragm 82 is so arranged as to cover the second recess portion 11b and seals the oil 70 inside the second recess portion 11b.

The first and second diaphragms 81 and 82 are bonded to the first and second port portions 12 and 13, respectively, through an adhesive made of a fluorosilicone type resin or a fluororesin. Incidentally, this adhesive is indicated by reference numeral 100 in the later-appearing FIG. 4.

O-rings 90 are disposed at portions of the connector case portion 11 to which the first and second diaphragms 81 and 82 are pushed to further reliably seal the oil 70 by the first and second diaphragms 81 and 82.

In the pressure sensor S1 shown in FIG. 1, the amount of the oil 70 arranged on the side of the first diaphragm 81 and the amount of the oil 70 arranged on the side of the second diaphragm 82 are preferably equal to each other with the sensor chip 20 being the boundary. This requirement can be satisfied by designing the pressure sensor S1 by taking the capacity of the first recess portion 11a, the capacity of the second recess portion 11b and the volumes of the sensor chip 20 and the base 30 into consideration.

Pressure introduction portions 12b and 13b each having an opening for introducing a pressure are formed in the first and second port portions 12 and 13 of the case 10, respectively, as shown in FIG. 2.

The pressure introduction port 12a of the first port portion 12 and the pressure introduction port 13a of the second port portion 13 shown in FIG. 1 communicate with the pressure introduction portions 12b and 13b of the first and second port portions 12 and 13 shown in FIG. 2, respectively.

For example, the pressure introduction portion 12b of the first portion 12 is connected to an upstream side pressure discharge pipe 220 and the pressure introduction portion 13b of the second pressure port portion 13 is connected to a downstream side pressure discharge pipe 230 in the EGR pipe 200 as shown in FIG. 2.

Here, a bracket 110 as a fitting member is assembled around the case 10 of this pressure sensor S1 through a screw member 120 as shown in FIGS. 1 and 2. The bracket 110 is made of a resin or a metal. When the screw member 120 is fastened with a nut 61, the bracket 110 is fixed to the case 10.

As shown in FIG. 2, the pressure sensor S1 is fitted to the EGR pipe 200 as the bracket 110 is screw-fixed to the EGR pipe 200 as the measured member.

Incidentally, the fitting condition of the pressure sensor S1 to the EGR pipe 200 through the bracket 110 is similar to the condition shown in FIG. 9. In other words, in the internal construction of the EGR pipe 200 at the connection portion of the pressure sensor S1, the orifice is interposed between the upstream side pressure discharge pipe 220 and the downstream side pressure discharge pipe 230 in the same way as in FIG. 9, though the construction is partly omitted in FIG. 2.

When this pressure sensor S1 is fitted and fixed to the EGR pipe 200, the pressure introduction portions 12b and 13b of the pressure sensor S1 are fitted to the EGR pipe (measured member) 200 through the ring-like seal ring 130.

The seal ring 130 is made of an elastic material such as a rubber or resin. In this embodiment, the seal ring 130 is a rectangular ring having a rectangular sectional shape, but a ring having a circular section, a C-shaped section or an X-shaped section may be used, too. This also holds true of the later-appearing embodiments.

A ring-like groove 140 is formed in each fitting surface 12c, 13c of each pressure introduction portion 12b, 13b of the pressure sensor S1 to the EGR pipe 200 and the seal ring 130 is accommodated and held inside this groove 140.

When the seal ring 130 is brought into close contact with the EGR pipe 200, the connection portions of the pressure introduction portions 12b and 13b and the EGR pipe 200 are hermetically sealed. Consequently, the pressures P1 and P2 inside the EGR pipe 200 can be introduced into the case 10 from the pressure introduction portion 12b and 13b without leakage.

The upstream side pressure P1 of the orifice inside the EGR pipe 200 is introduced from the pressure introduction portion 12b into the first diaphragm 81 through the pressure introduction port 12a in the first port portion 12. On the other hand, the downstream side pressure P2 of the orifice inside the EGR pipe 200 is introduced from the pressure introduction portion 13b into the second diaphragm 82 through the pressure introduction port 13a in the second port portion 13.

The sensor chip 20 as the sensing portion receives the pressures P1 and P2 applied to the first and second diaphragms 81 and 82 through the oil 70. The sensor chip 20 detects the pressure difference between the pressure P1 received from the side of the first diaphragm 81 and the pressure P2 received from the side of the second diaphragm 82.

In the embodiment employing the pressure introduction form described above, the front surface of a diaphragm, not shown, receives the upstream side pressure P1 of the orifice from the side of the first diaphragm 81 and the back surface of the diaphragm receives the downstream side pressure P2 of the orifice from the side of the second diaphragm 82.

The diaphragm of the sensor chip 20 undergoes deformation due to the pressure difference between both pressures P1 and P2 and the signal resulting from this distortion is outputted outside from the terminal 10a of the sensor chip 20 through the wire 40. The pressure detection is carried out in this way.

In this embodiment, the construction of the seal ring 130 and the groove 140 in the pressure sensor S1 has the following peculiar features. FIGS. 3A to 3D are enlarged views showing the portions in the proximity of the pressure introduction portions 12b and 13b in the pressure sensor S1.

Figure 3A:
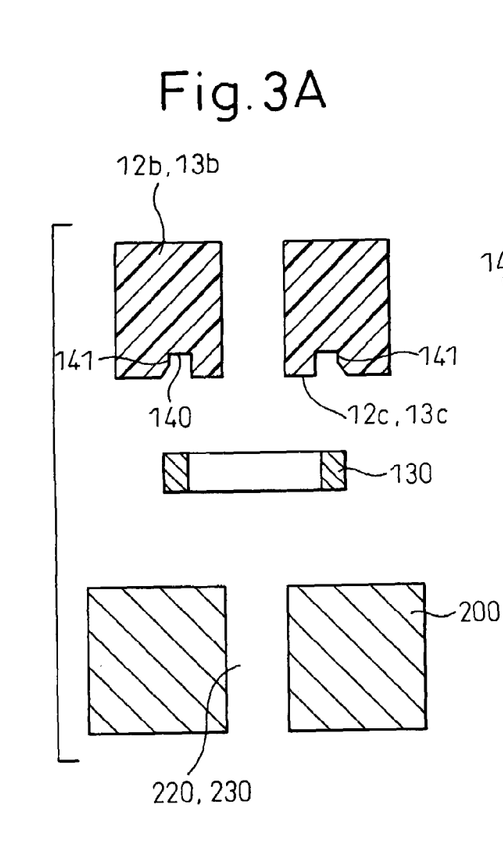
FIGS. 3A to 3D show in enlargement a detailed construction of a portion in the vicinity of a pressure induction portion in the pressure sensor shown in FIG. 1.
Figure 3B:
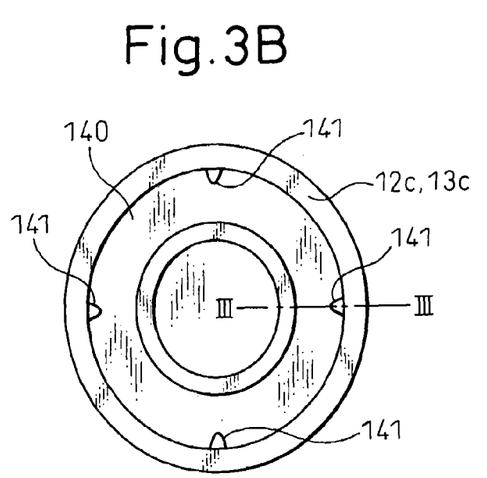
Figure 3C:
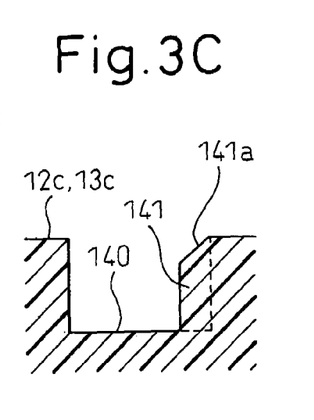
Figure 3D:
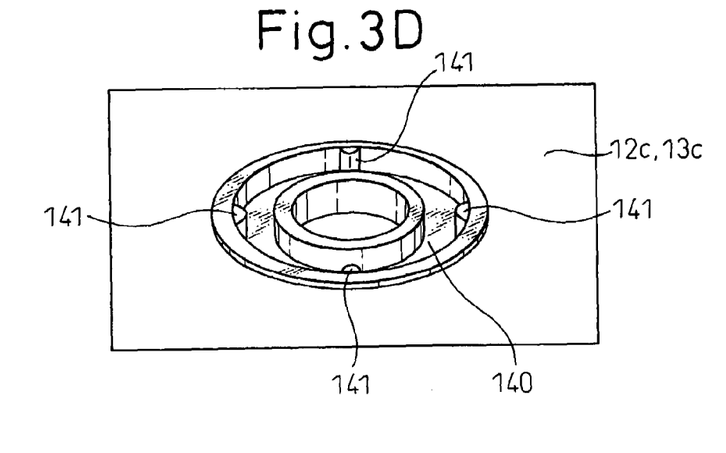

FIG. 3A is a schematic sectional view of the pressure introduction portions 12b and 13b, the seal ring 130 and the EGR pipe 200. FIG. 3B is a plan view of the groove 140 formed in the fitting surfaces 12c and 13c of the pressure introduction portions 12b and 13b. FIG. 3C is a schematic sectional view taken along a line III—III of FIG. 3B. FIG. 3D is a perspective view of the groove 140.

Projection portions 141 are so formed on the side surface of the outer circumference of the groove 140 as to protrude from the side surface. Here, at least two projection portions 141 are preferably formed and four projection portions 141 are formed in this embodiment.

In the state where the seal ring 130 is stored in the groove 140, the portions of the seal ring 130 that keep contact with the projection portions 141 are pressed into and held by the groove 140.

More concretely, the projection length of the projection portion 141 may be decided so that the distal end of each projection portion 141 protruding from the side surface of the outer periphery of the groove 140 enters an imaginary circle defined by the outer diameter of the seal ring 130. Consequently, the press-in state of the seal ring 130 in the projection portion 141 can be accomplished. The projection distance of each projection portion 141 from the side surface of the groove 140 is such that when the seal ring 130 is pressed in and fitted to the EGR pipe 200, the seal ring 130 does not swell out from the groove 140 as shown in FIG. 11C.

In other words, this embodiment has a peculiar construction in which the seal ring 130 is held inside the groove 140 when a part of the seal ring 130 is pressed into the groove 140.

In a preferred form of this embodiment, the surface of each projection portion 141 has a convex curve shape as shown in FIGS. 3B and 3D. In other words, the surface of the projection portion 141 has a curve shape on which corners do not exist.

In another preferred form of this embodiment, the surface on the side of each fitting surface 12c, 13c of each projection portion 141 is a taper surface 141a that progressively separates from the fitting surface 12c, 13c from the root side toward the distal end side of the projection 141 as shown in FIG. 3C.

Figure 4:
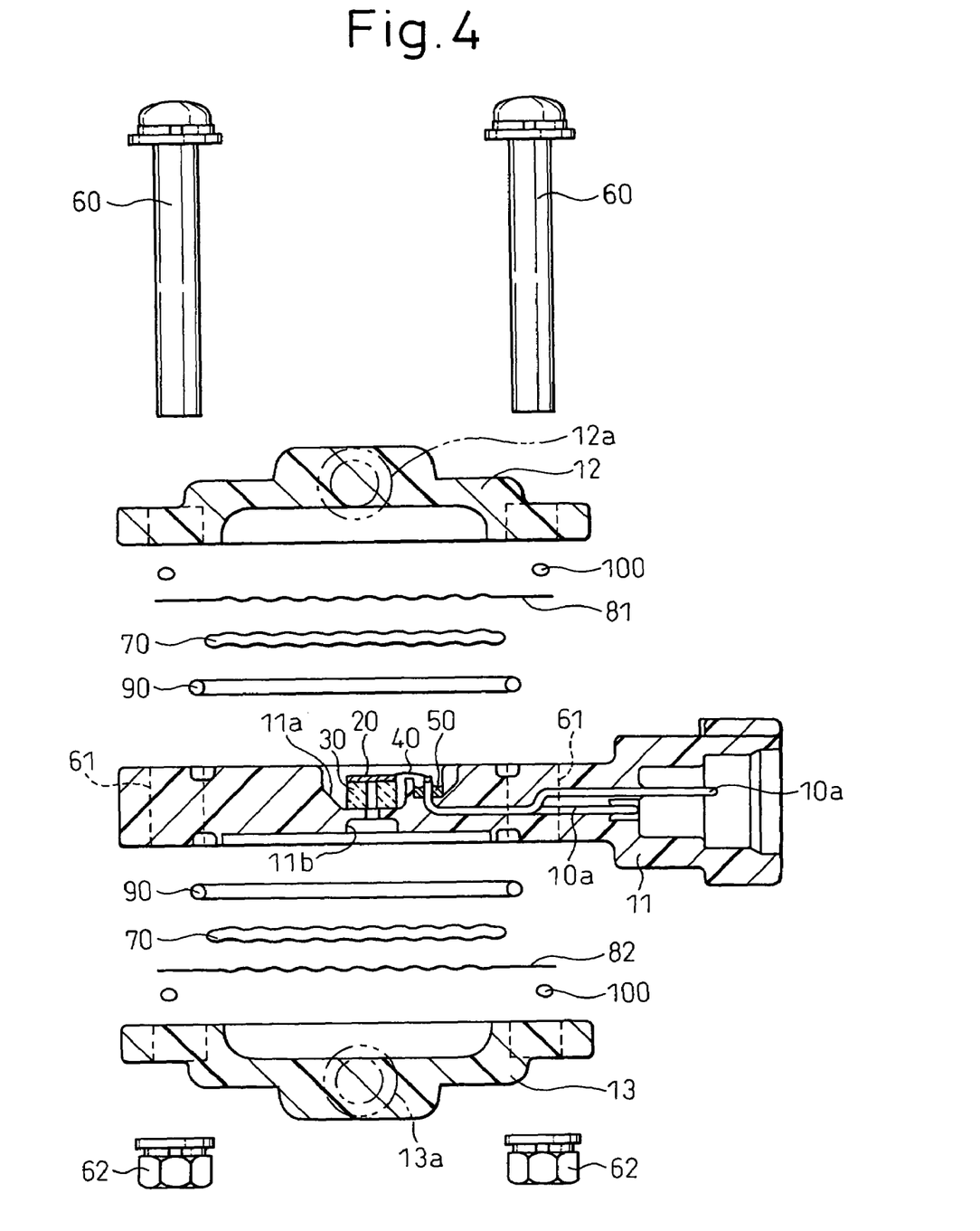
FIG. 4 is an exploded view of the pressure sensor shown in FIG. 1.

Next, an example of a production method of the pressure sensor S1 will be explained with reference also to FIG. 4. FIG. 4 is an exploded view of each part of the sensor S1 shown in FIG. 1 with the exception of the bracket 110 and the screw member 120 for fixing the bracket 110 to the sensor main body.

One of the end portions of the terminal 10a exposed inside the first recess portion 11a is sealed with the seal member 50 in the connector case portion 11 with which the terminal 10a and the nut 61 are insert-molded.

Next, the sensor chip 20 integrated with the base 30 is bonded and fixed to the first recess portion 11a of the connector case portion 11 and the sensor chip 20 and the terminal 10a are wired by wire bonding.

The first diaphragm 81 is then bonded to the first port portion 12 by use of the adhesive 100 and the oil 70 is charged into the first recess portion 11a of the connector case portion 11. The O-ring 90 is then set to the connector case portion 11.

The connector case portion 11 and the first port portion 12 are integrated in a vacuum, while screw-fastening them with the screws 60 and the nuts 61, to seal the oil 70. Here, screw fastening is made with the screws 60 lest bubbles are entrapped in the oil 70.

The second port portion 13 is thereafter screw-fixed in vacuum to the connector case portion 11 by the nuts 62 while interposing the second diaphragm 82, the oil 70 and the O-ring 90 in the same way as the first port portion 12.

After performance adjustment and test is carried out, the bracket 110 is fitted and fixed to the case 10 through the screw member 120 as shown in FIG. 1. Finally, the seal rings 103 are pressed into and held by the grooves 140 of the pressure introduction portions 12b and 13b. The pressure sensor S1 shown in FIG. 1 can thus be completed.

The pressure sensor S1 so completed is set to the mounting portion of the EGR pipe 200 while the EGR pipe 200 is positioned down with the pressure sensor S1 positioned up and the seal ring 130 faces down as shown in FIG. 2.

The bracket 110 is fixed to the EGR pipe 200 by using screw members, etc, not shown. In this way, the assembly structure of the pressure sensor S1 to the EGR pipe 200 is formed and pressure detection by the pressure sensor S1 becomes possible.

In the pressure sensor including the sensor chip 20 as the sensing portion for detecting the pressure, the pressure introduction portions 12b and 13b for introducing the pressure from the EGR pipe 200 to the sensor chip 20, fitted to the EGR pipe 200 as the measured member through the ring-like seal ring 130, and the ring-like grooves 140 for accommodating the seal ring 130, formed in the fitting surfaces 12c and 13c of the pressure introduction portions 12b and 13b, this embodiment provides the pressure sensor S1 having the main feature in that a part of the seal ring 130 is pressed into the groove 140 and is held inside the groove 140.

According to this embodiment, because a part of the seal ring 130 is pressed into the groove 140 and is held inside the groove 140, the seal ring 130 doe not fall off from the groove 140 even when the sealing ring 130 is turned in the downward direction.

Because it is only necessary to establish the press-in state of a part of the seal ring 130 into the groove 140, the outer dimension of the groove 140 at portions other than this press-in portion can have a sufficient margin.

More concretely, the width of the groove 140 can be sufficiently enlarged with respect to the size of the seal ring 130 at portions of the seal ring 130 that do not keep contact with the projection portion 141 as shown in FIGS. 3A to 3D. Accordingly, swell-out of the seal ring from the groove that occurs in the prior art (see FIG. 11C) can be prevented.

According to the pressure sensor S1 of this embodiment, fall-off and damage of the seal ring 130 at the time of fitting to the EGR pipe 200 as the measured member can be prevented.

According to this embodiment, therefore, the state in which a part of the seal ring 130 is pressed into the groove 140 can be appropriately accomplished by forming the projection portions 141 on the side surface of the groove 140 and pressing a part of the sealing ring 130 at the projection portion 141 into the groove 140.

According to the preferred form described above, the surface of the projection portion 141 is the convex curve surface (see FIG. 3). Because the corners are eliminated from the projection portion 141 in this way, the damage of the seal ring 130 pressed into the projection portion 141 can be desirably prevented.

In the still more preferred form, the surface of the projection portion 141 on the side of the fitting surfaces 12c and 13c is the taper surface 141a that progressively separates from the fitting surfaces 12c and 13c from the root side of the projection portion 141 towards its distal end (see FIGS. 3A to 3D).

Because the surface of the projection portion 141 on the side of the fitting surfaces 12c and 13c is the taper surface 141a in this way, the portion of the seal ring 130 that comes into contact with, and is pressed into, the projection portion 141 is prevented from swelling out and from being clamped between the fitting surfaces 12c, 13c and the EGR pipe 200 at the time of the assembly of the GR pipe 200. In other words, catching of the seal ring 130 at the projection portion 141 can be prevented.

Because the surface of the projection portion 141 on the side of the fitting surfaces 12c and 13c is the taper surface 141a, insertion of the seal ring 130 into the groove 140 can be smoothly made and the assembly factor of the sealing ring 130 can be improved.

Modified Embodiment

Figure 5A:
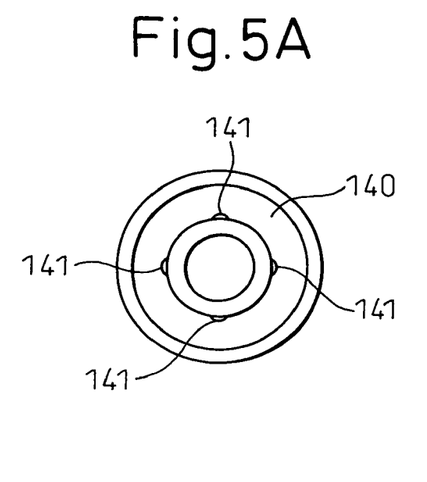
FIGS. 5A and 5B show modified embodiments of the first embodiment.
Figure 5B:
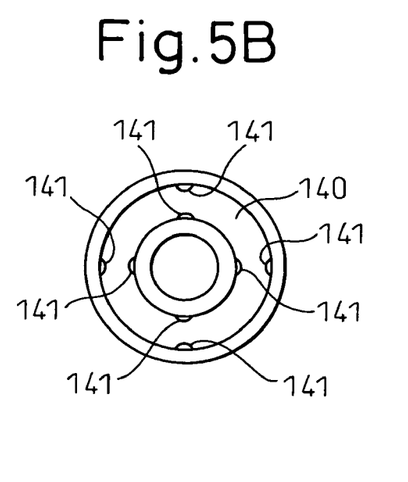

FIGS. 5A and 5B show modified embodiments of the invention and are plan views of the groove 140.

The projection portions 141 are shown formed on the side surface of the outer periphery of the groove 140 in FIGS. 3A to 3D. However, the projection portion 140 may be formed on the side surface of the inner peripheral side of the groove 140 as shown in FIG. 5A or may be formed on the side surfaces of both inner and outer peripheral sides as shown in FIG. 5B.

Concretely, in the case of the projection portion 141 that protrudes from the side surface of the groove 140 on its inner peripheral side, the projection length of the projection portion 141 may be decided so that the distal end of the projection portion 141 protrudes out from the imaginary circle defined by the inner diameter of the seal ring 130. In this way, the press-in state of the seal ring 130 at this projection portion 141 can be accomplished.

In this embodiment, at least two projection portions 141 formed on the side surface of the groove 140 preferably exist but the number of the projection portion 141 may be only one so long as retention of the seal ring 130 to the groove 140 is made sufficiently.

Second Embodiment

FIG. 6 shows the principal portions of the second embodiment of the invention and represents the characteristic feature of the seal ring 130 according to this embodiment. In FIGS. 6A to 6D, FIGS. 6B and 6D show a planar construction. FIG. 6A is a schematic sectional view taken along a line VI$_1$—VI$_1$ of FIG. 6B and FIG. 6C is a schematic sectional view taken along a line VI$_2$—VI$_2$ of FIG. 6D.

In the foregoing embodiment, the projection portion 141 is formed on the side surface of the groove 140. In this embodiment, however, the projection portion 131 protruding from the surface of the seal ring 130 is formed on this surface but not on the groove 140.

Figure 6A:
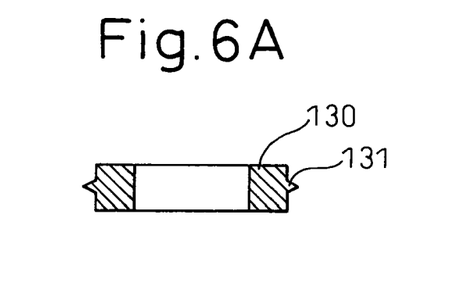
FIGS. 6A to 6D show a construction of a seal ring according to a second embodiment of the invention.
Figure 6B:
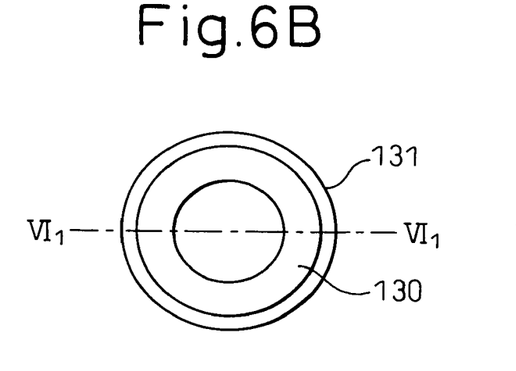

In the embodiment shown in FIGS. 6A and 6B, the projection portion 131 of the seal ring 130 is so formed as to extend round the seal ring 130 in the circumferential direction. In the embodiment shown in FIGS. 6C and 6D, the projection portion 131 of the seal ring 130 is formed at a plurality of positions on the outer circumferential side surface of the seal ring 130.

Figure 6C:
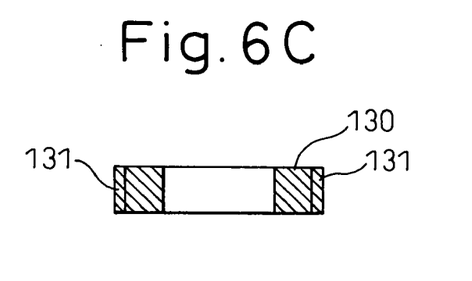
Figure 6D:
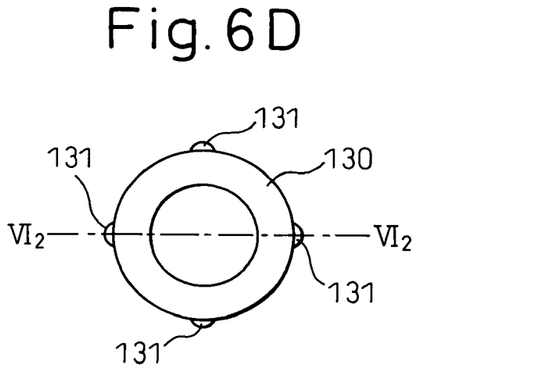

When the projection portion 131 is disposed as in the embodiment shown in FIGS. 6C and 6D, at least two projection portions 131 are preferably formed and four projection portions 131 are formed in this embodiment. Further, when the projection portions are provided on the seal ring 130, the projection portions may be formed on the side surface of the inner peripheral side of the seal ring 130 or may be formed on the side surfaces of both inner and outer peripheral sides.

When the projection portion 131 is projected from the side surface of the outer peripheral side of the seal ring 130, the projection length of the projection portion 131 may be decided so that its distal end protrudes from the imaginary circle defined by the outer diameter of the groove 140. The projection length of the projection portion 131 protruding from the side surface of the seal ring 130 is the length such that when the seal ring 130 is pressed in and fitted to the EGR pipe 200, the seal ring 130 does not swell out from the groove 140 as shown in FIG. 11C.

In the case of the projection portion 131 protruding from the inner circumferential side surface of the seal ring 130, on the other hand, the projection length of the projection portion may be decided so that its distal end enters the imaginary circle defined by the inner diameter f the groove 140. Consequently, the press-in state of the seal ring 130 can be accomplished at this projection portion 131.

According to this embodiment employing such a seal ring 130 having the projection portion 131, the seal ring 130 is pressed into the groove 140 at the projection portion 131 of the seal ring 130 and is held with respect to the groove 140.

In other words, in this embodiment, too, a part of the seal ring 130 is pressed into the groove 140 and the seal ring 130 is held inside the groove 140.

In this case, too, the state in which the projection portion 131 of the seal ring 130 is pressed into the groove 140 must be established. Therefore, the outer size of the groove 140 at portions other than this press-in portion may have a sufficient margin with respect to the outer shape of the seal ring 130.

More concretely, the width of the groove 140 can be set to a sufficiently large value with respect to the thickness of the seal ring 130 at portions other than the projection portions 131 of the seal ring 130. Therefore, swell-out of the seal ring from the groove (see FIG. 11C) that has occurred in the prior art can be reduced to minimum.

In the pressure sensor according to this embodiment, therefore, fall-off and damage of the seal ring 130 at the time of assembly to the EGR pipe 200 as the measured member can be prevented in the same way as in the foregoing embodiment.

In the embodiment shown in FIGS. 6C and 6D, at least two projection portions are preferably formed on the side surface of the seal ring 130 but the number of the projection portion 130 may be only one so long as retention of the seal ring 130 to the groove 140 is sufficiently made.

Third Embodiment

Figure 7A:
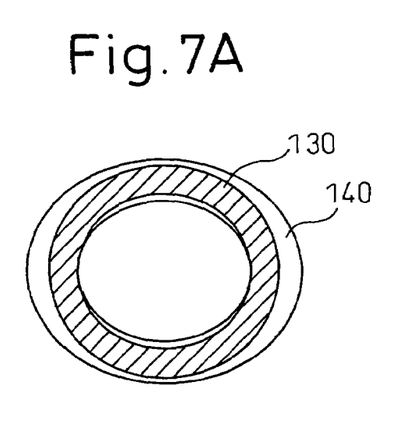
FIGS. 7A and 7B show a planar construction of a seal ring and a groove according to a third embodiment of the invention.
Figure 7B:
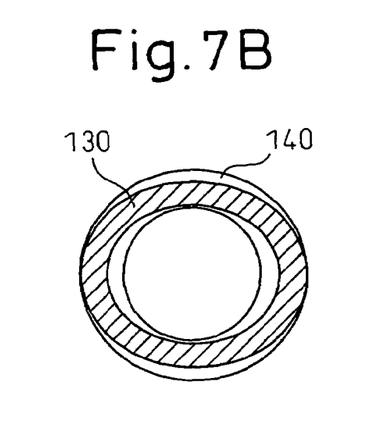

FIGS. 7A and 7B show the principal portions of the invention and show a planar construction of the seal ring 130 and the groove 140. Incidentally, the surface of the seal ring 130 is hatched for convenience sake and for identification.

Each of the foregoing embodiments has the construction in which a part of the seal ring 130 is pressed into the groove 140 and is held inside the groove 140 and the projection portions are disposed on the groove 140 or the seal ring 130.

As a retaining structure of the seal ring 130, by press-in of a part of the seal ring 130 into the groove 140, this embodiment employs the construction in which the shape of the seal ring 130 is a perfect circle and the shape of the groove 140 is elliptic, as shown in FIG. 7A, or, on the contrary, the shape of the seal ring 130 is elliptic and the shape of the groove 140 is a perfect circle as shown in FIG. 7B.

The circle need not be a completely perfect circle. In the embodiment shown in FIG. 7A, for example, the ring shape of the seal ring 130 may be a shape approximate to the perfect circle in comparison with the shape of the groove 140 that is elliptic.

Consequently, the portion at which a part of the side surface of the seal ring 130 and a part of the side surface of the groove 140 keep contact with each other is formed and the seal ring 130 is pressed into the groove 140 at this portion and is held in the groove 140.

In this case, too, the outer size of the groove 140 can have a sufficient margin with respect to the outer shape of the seal ring at portions other than the press-in portion between the seal ring 130 and the groove 140 in the same way as in the foregoing embodiments.

In the pressure sensor according to this embodiment, therefore, fall-off and damage of the seal ring 130 at the time of assembly to the EGR pipe 200 as the measured member can be prevented in the same way as in the foregoing embodiments.

Fourth Embodiment

Figure 8A:
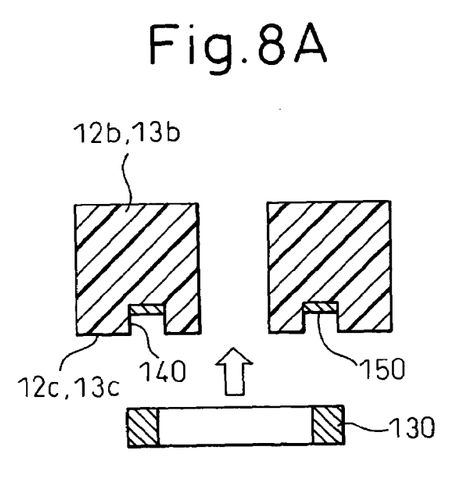
FIGS. 8A and 8B show a schematic sectional construction of a pressure introduction portion and a seal ring according to a fourth embodiment of the invention.
Figure 8B:
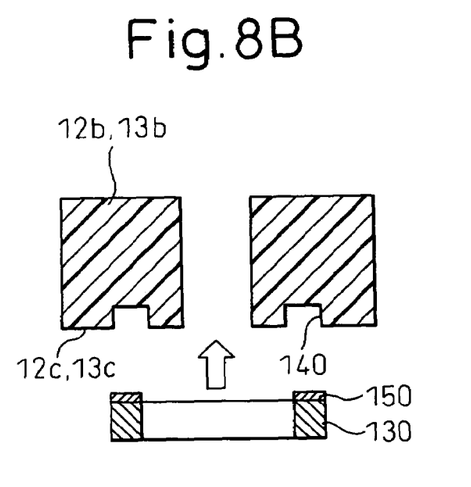

FIGS. 8A and 8B show the principal portions of the fourth embodiment of the invention and show a schematic sectional construction of the pressure introduction portions 12b and 13b and the seal ring 130 of the embodiment.

Each of the foregoing embodiments employs the construction in which the seal ring 130 is held inside the groove 140 as a part of the seal ring 130 is pressed into the groove 140. However, this embodiment employs a construction in which the seal ring 130 is held inside the groove 140 because it is bonded to the groove 140 as shown in FIGS. 8A and 8B.

More concretely, as shown in FIG. 8A, it is possible to apply an adhesive 150 to the groove 140 and to bond and hold the seal ring 130 inside the groove 140, or to apply the adhesive 150 to the seal ring 130 and to bond and hold the seal ring 130 inside the groove 140, on the contrary, as shown in FIG. 8B.

In this embodiment, it is not necessary to dispose the projection portions 131 and 141 on the groove 140 or the seal ring 130 and to shape one of the groove 140 and the seal ring 130 into the perfect circle shape with the other being elliptic, and the shapes of the groove 140 and the seal ring 130 may be the same shapes as those of the prior art.

According to this embodiment, as the seal ring 130 is bonded to the groove 140 and is held inside the groove 140, the seal ring 130 does not fall off from the groove 140 even when the seal ring 130 is turned in the downward direction.

As it is only necessary to bond the seal ring 130 to the groove 140, the outer shape of the groove 140 may have a sufficient margin in comparison with the outer shape of the seal ring 130. Therefore, swell-out of the seal ring 130 from the groove 140 (see FIG. 11C) that has occurred in the prior art can be prevented as much as possible.

According to the pressure sensor of this embodiment, fall-off and damage of the seal ring 130 at the time of assembly to the EGR pipe 200, as the measured member, can be prevented in the same way as in the foregoing embodiments.

Incidentally, it would be obvious that this embodiment can be applied in combination with the construction in which a part of the seal ring 130 is pressed into the groove 140 as in each of the foregoing embodiments.

OTHER EMBODIMENTS

In the first and second embodiments described above, the projection portions 131 and 141 are disposed on either one of the groove 140 and the seal ring 130. However, the projection portions may be disposed on both of the groove 140 and the seal ring 130.

The pressure difference detection type pressure sensor S1 described above can be applied as a sensor for detecting an intake pressure inside an intake pipe of an engine or an exhaust pressure inside an exhaust pipe.

For example, the pressure sensor can be applied as a pressure difference detection type pressure sensor that is fitted to the exhaust pipe to detect a pressure loss of a DPF (Diesel Particulate Filter) disposed in the exhaust pipe of a Diesel engine of an automobile to detect the pressure difference of the exhaust pipe before and after the DPF.

In addition, the present invention can be applied to a pressure sensor for detecting an absolute pressure sensor besides the pressure difference (relative pressure) detection type pressure sensor so long as it employs a direct mount structure which includes a sensing portion and pressure introduction portions and in which the pressure introduction portions are directly fitted to the measured member through a seal ring.

More concretely, in the pressure difference type pressure sensor, both surfaces of the sensing portions receive the measurement pressure. In the pressure sensor of the type for detecting the absolute pressure, one of the surfaces of the sensing portion keeps a reference pressure (atmospheric pressure, for example) and the other surface receives the measurement pressure.

While the invention has been described by reference to specific embodiments chosen for purposes of illustration, it should be apparent that numerous modifications could be made thereto by those skilled in the art without departing from the basic concept and scope of the invention.

The invention claimed is:
1. A pressure sensor comprising:
a sensing portion for detecting a pressure;
a pressure introduction portion fitted to a measured member through a ring-like seal ring, for introducing a pressure from said measured member into said sensing portion; and
a ring-like groove for accommodating said seal ring, formed in a fitting surface of said pressure introduction portion to said measured member;
wherein a part of said seal ring is pressed into said groove and said seal ring is retained inside said groove, wherein a projection portion protruding from a side surface of said groove is formed on said side surface, and a part of said seal ring is pressed at said projection portion into said groove, wherein a surface of said projection portion has a convex curve shape.

2. A pressure sensor as defined in claim 1, wherein said projection portion further includes a taper surface progressively tapering from said fitting surface from a root side to a distal end of said projection portion.

3. A pressure sensor as defined in claim 1, wherein a number of said projection portions formed on the side surface of said groove is at least two.

4. A pressure sensor as defined in claim 1, wherein a projection portion is so formed on a surface of said seal ring as to protrude from the surface, and said seal ring is pressed at said projection portion into said groove.

5. A pressure sensor as defined in claim 4, wherein a number of said projections portions formed on the surface of said seal ring is at least two.

6. A pressure sensor as defined in claim 1, wherein a projection portion protruding from a surface of said seal ring is formed on said surface, and said seal ring is pressed into said groove at said projection portion formed on the side surface of said groove and at said projection portion formed on the surface of said seal ring.

7. A pressure sensor as defined in claim 6, wherein a protruding length of said projection portion formed on the side surface of said groove and a protruding length of said projection portion formed on the surface of said seal ring are such that when said seal ring is pressed into said groove and said pressure introduction portion is fitted to said measured member, said seal ring does not swell out from said groove and is not caught.

8. A pressure sensor as defined in claim 1, wherein a shape of said seal ring is a perfect circle and a shape of said groove is elliptic.

9. A pressure sensor as defined in claim 1, wherein a shape of said seal ring is elliptic and a shape of said groove is a perfect circle.

10. A pressure sensor as defined in claim 1, wherein said seal ring is bonded to said groove.

11. A pressure sensor comprising:
a sensing portion for detecting a pressure;
a pressure introduction portion fitted to a measured member through a ring-like seal ring, for introducing a pressure from said measured member into said sensing portion; and
a ring-like groove for accommodating said seal ring, formed in a fitting surface of said pressure introduction portion to said measured member;
wherein said seal ring is bonded to and retained inside said groove,
wherein a projection portion protruding from a side surface of said groove is formed on said side surface, and a part of said seal ring is pressed at said projection portion into said groove, and
wherein a surface of said projection portion has a convex curve shape.

12. A pressure sensor as defined in claim 11, wherein said projection portion further includes a taper surface progressively tapering from said fitting surface from a root side to a distal end of said projection portion.

13. A pressure sensor comprising:
a sensing portion for detecting a pressure;
a pressure introduction portion fitted to a measured member through a ring-like seal ring, for introducing a pressure from said measured member into said sensing portion; and
a ring-like groove for accommodating said seal ring, formed in a fitting surface of said pressure introduction portion to said measured member;
wherein a part of said seal ring is pressed into said groove and said seal ring is retained inside said groove,
a projection portion protruding a distal end thereof into said groove toward said seal ring from a side surface of said groove being formed on said side surface, and a part of said seal ring is pressed at said projection portion into said groove,
wherein said projection portion further includes a taper surface beginning at a top of said side surface progressively tapering from said fitting surface from a root side to the distal end of said projection portion.

* * * * *

UNITED STATES PATENT AND TRADEMARK OFFICE
CERTIFICATE OF CORRECTION

PATENT NO. : 7,197,936 B2  Page 1 of 1
APPLICATION NO. : 10/994295
DATED : April 3, 2007
INVENTOR(S) : Hironobu Baba It is certified that error appears in the above-identified patent and that said Letters Patent is hereby corrected as shown below:

Title Page

Add Item (30), as Foreign Priority Data:

--November 25, 2003 (JP) 2003-394075--

Correct Item (73), as Assignee's name:

Denso --Corporation,-- Kariya (JP)

Signed and Sealed this

Twenty-ninth Day of April, 2008

JON W. DUDAS
*Director of the United States Patent and Trademark Office*